(12) United States Patent
Vanderkamp et al.

(10) Patent No.: US 9,387,938 B1
(45) Date of Patent: Jul. 12, 2016

(54) TERRAIN AWARENESS AND WARNING SYSTEMS AND METHODS

(71) Applicants: Travis S. Vanderkamp, Marion, IA (US); Samuel M. Waweru, Cedar Rapids, IA (US)

(72) Inventors: Travis S. Vanderkamp, Marion, IA (US); Samuel M. Waweru, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/489,230

(22) Filed: Sep. 17, 2014

(51) Int. Cl.
*G08G 5/00* (2006.01)
*B64D 45/00* (2006.01)

(52) U.S. Cl.
CPC .................................... *B64D 45/00* (2013.01)

(58) Field of Classification Search
CPC ... G08G 5/0021; G08G 5/025; G08G 5/0078; G08G 5/0013; G08G 5/0052; G08G 5/0086; G08G 5/0008; G08G 5/003; G08G 5/0034; G08G 5/0039; G08G 5/0065; G08G 5/045; G08G 5/0004; G08G 5/0043; G08G 5/00
USPC ......... 340/947, 975, 948, 949, 977, 980, 981, 340/982, 985–987, 990, 995.1, 995.11, 340/995.17
See application file for complete search history.

(56) References Cited

U.S. PATENT DOCUMENTS

| | | | |
|---|---|---|---|
| 4,646,244 A | 2/1987 | Bateman et al. | |
| 5,945,926 A | 8/1999 | Ammar et al. | |
| 7,688,254 B2 * | 3/2010 | Khatwa | G01S 7/062 342/123 |
| 8,019,491 B1 | 9/2011 | McCusker | |
| 8,232,910 B1 | 7/2012 | Burton | |
| 8,554,264 B1 * | 10/2013 | Gibbons | H04H 20/71 455/127.1 |
| 2002/0138194 A1 * | 9/2002 | Flynn | G01C 23/00 701/120 |
| 2003/0156046 A1 | 8/2003 | Dwyer et al. | |
| 2006/0253231 A1 | 11/2006 | Khatwa | |
| 2009/0121901 A1 * | 5/2009 | Namier | G01C 23/00 340/975 |
| 2010/0070110 A1 * | 3/2010 | Badli | G08G 5/0052 701/3 |
| 2010/0231705 A1 * | 9/2010 | Yahav | G02B 27/01 348/115 |
| 2011/0184635 A1 * | 7/2011 | Khatwa | G08G 5/065 701/120 |
| 2011/0313597 A1 * | 12/2011 | Wilson | G01C 23/00 701/3 |

OTHER PUBLICATIONS

Non-Final Office Action on U.S. Appl. No. 14/464,547 dated Jan. 21, 2016, 8 pages.

* cited by examiner

*Primary Examiner* — Daniel Previl
(74) *Attorney, Agent, or Firm* — Donna P. Suchy; Daniel M. Barbieri

(57) ABSTRACT

Systems and methods for use in generating alerts regarding terrain near aircraft are provided. A method includes determining a location of interest relative to an aircraft using a terrain awareness and warning system. The method further includes calculating a distance value and a bearing value for the location of interest relative to the aircraft. The method further includes providing first display data to an electronic display and providing second display data to the electronic display. The first display data is configured to cause the electronic display to show an aircraft situation display image indicating the location of interest relative to the aircraft. The second display data is configured to cause the electronic display to show the calculated distance value and the calculated bearing value.

23 Claims, 5 Drawing Sheets

TERRAIN AWARENESS AND WARNING SYSTEMS AND METHODS

CROSS-REFERENCE TO RELATED PATENT APPLICATIONS

The present application is related to U.S. patent application Ser. No. 14/464,547 filed on Aug. 20, 2014, by Kirtz et al., entitled "Terrain Warning Systems and Methods," which is assigned to the assignee of the present application and incorporated herein by reference.

BACKGROUND

The present disclosure relates generally to the field of terrain awareness for aircraft. More particularly, the present disclosure relates to systems and methods that display data regarding potentially dangerous terrain or locations of interest near an aircraft.

Aircraft pilots rely on situational awareness systems, such a terrain awareness and warning system (TAWS), weather radar systems, and/or a traffic collision and avoidance system (TCAS), to avoid collisions with hazards, such as terrain, man-made structures, weather, and other aircraft. A typical TAWS may analyze aircraft sensor data and/or other data to predict whether the path of the aircraft is likely to intersect with hazards, such as terrain and/or man-made structures. For instance, such systems may compare an altitude of the aircraft to elevation of terrain near the aircraft and provide an indication of terrain that has a high enough elevation to be of potential concern to the pilot. The TAWS may provide the aircraft pilot and/or other flight crew members with advance audio and/or visual warnings of impending terrain or structural hazards, as well as forward looking capability, thereby providing sufficient time for flight crew to implement appropriate corrective maneuvers and/or other safety measures.

In order to comply with, for example, Technical Standard Order TSO-C151c, class A equipment for a TAWS must depict terrain relative to an aircraft's position such that the pilot is able to estimate the relative bearing to the terrain of interest. The terrain must also be depicted relative to the airplane's position such that the pilot is able to estimate the distance to the terrain of interest. However, despite current advances in facilitating the situational awareness of a pilot regarding his or her surroundings, quickly estimating the relative bearing and distance to the terrain of interest from aircraft situation display images remains challenging and difficult. Current TAWS configurations typically show an aircraft's "own-ship" position as well as visually distinct terrain or structures of interest, with hazardous terrain distinguished from nonhazardous terrain. As such, pilots are often limited to performing quick and rough mental estimations of bearing and distance to terrain of interest based on the TAWS display at the same time as performing other critical tasks and functions, such as determining and executing appropriate corrective measures. Accordingly, there exists a need for systems and methods that enhance a pilot's ability to quickly discern information regarding the location of terrain or structures in relation to an aircraft or flight path.

SUMMARY

One embodiment of the present disclosure relates to a method for providing display data to electronic displays of an aircraft. The method includes determining a location of interest relative to an aircraft using a terrain awareness and warning system, and calculating a distance value and a bearing value for the location of interest relative to the aircraft. The method further includes providing first display data and second display data to an electronic display. The first display data is configured to cause the electronic display to show an aircraft situation display image indicating the location of interest relative to the aircraft. The second display data is configured to cause the electronic display to show the calculated distance value and the calculated bearing value.

Another embodiment of the present disclosure relates to a system for providing display data to electronic displays of an aircraft. The system includes an electronic display and an electronic processor. The electronic processor is configured to determine a location of interest relative to an aircraft using a terrain awareness and warning system. The electronic processor is further configured to calculate a distance value and a bearing value for the location of interest relative to the aircraft. The electronic processor is further configured to provide first display data and second display data to an electronic display. The first display data is configured to cause the electronic display to show an aircraft situation display image indicating the location of interest relative to the aircraft. The second display data is configured to cause the electronic display to show the calculated distance value and the calculated bearing value.

Another embodiment of the present disclosure relates to one or more non-transitory computer-readable storage media having instructions stored thereon. The instructions are executable by one or more processors of an aircraft to determine a location of interest relative to an aircraft using a terrain awareness and warning system. The instructions are further executable by the one or more processors to calculate a distance value and a bearing value for the location of interest relative to the aircraft. The instructions are further executable by the one or more processors to provide first display data and second display data to an electronic display. The first display data is configured to cause the electronic display to show an aircraft situation display image indicating the location of interest relative to the aircraft. The second display data is configured to cause the electronic display to show the calculated distance value, the calculated bearing value, and an indicator line extending from the aircraft to the location of interest.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
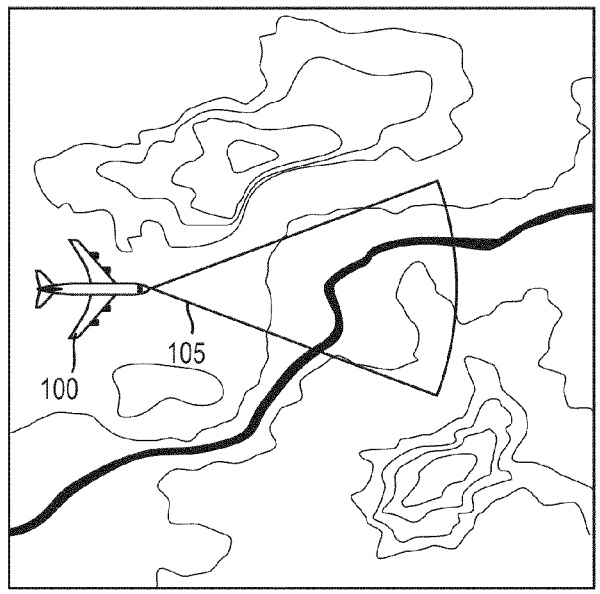
FIG. 1 is an illustration of an aircraft having a terrain awareness system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to provide display data, including alerts of potentially dangerous terrain, to electronic displays of an aircraft are described with respect to various exemplary embodiments. During an alert from a terrain awareness and warning system (TAWS), identifying the terrain of interest can be difficult, particularly depending on how the terrain and alert is depicted on board the aircraft. In some cases, the trigger for an alert may be a single terrain cell. Identification of terrain of interest by the size of the terrain cell alone can be difficult without some type of blooming utility, especially at a ten nautical mile range, which is often used on a topographic plan view map during alert conditions. Even when the size of the terrain triggering the alert is significant, displaying a terrain alert in conjunction with a relative terrain overlay (e.g., displaying different terrain elevation levels in different colors/shades, etc.) can cause confusion, as the colors may not be immediately distinguishable or the number or combination of colors on screen may be confusing to the pilot or flight crew.

Some methods of calling attention to locations of interest, including terrain alerts, obscure or otherwise impede viewing the underlying terrain, such that a pilot may be aware of the alert but may not know specific details pertaining to the terrain. For example, some systems highlight the terrain associated with an alert but do not provide any other information, such as geographic location of the terrain relative to the aircraft, geographic location of the terrain relative to the aircraft's bearing, the distance the terrain is from the aircraft, and the amount of time until impact occurs. Some warning systems provide display data that cause terrain associated with an alert to appear in a lower resolution, such that it appears "blocky" when overlaid against a high resolution topographic map. Other systems call attention to the terrain by causing the alerted terrain to flash. Such alerts are not always uniform in character, and may not be immediately recognizable to flight crew.

In some embodiments, a system may determine warnings relating to terrain near an aircraft. The warnings may indicate terrain above a threshold elevation, such as terrain within a certain threshold elevation from a current altitude of the aircraft. For each warning, the system may generate alert data formatted for display on a display device as an alert. In some embodiments, the alert may be provided within a plan view display screen on or proximate to a position associated with the warning. The plan view display may be a two-dimensional horizontal view of the terrain near the aircraft. The alert may overlap a visual representation of the terrain and may be at least partially transparent, such that the terrain overlapped by the alert may be visible through the alert. A transparent (e.g., hollow) shape may allow for continued depiction of the detailed center of the alert area, such that terrain detail is not lost or substantially reduced when an alert symbol or alert data is placed on the map.

In some embodiments, the same alert shape is used for all warnings, regardless of the size and/or shape of the terrain associated with the warning. In this way, using a consistent shape across all warnings ensure that the alerts are easily identifiable to a pilot and distinguishable from other information (e.g., relative terrain data, etc.) shown on the display screen. Using a consistent shape across all warnings enables pilots to become trained to know and understand what the alert shape represents, thereby preventing a pilot from having to waste precious time searching the display for an alert or studying the shape of displayed terrain to determine the area of most immediate concern (e.g., nearest terrain). In some embodiments, the alert shape may be a circle, square, rectangle, triangle, trapezoid, or other shape. In some embodiments, the same alert shape is used to alert a pilot to terrain, but the size of the shape may be dependent on the size of the alert area. For example, larger locations of interest may be highlighted with a larger shape.

In some embodiments, the alert data may be formatted for display as an alert having a shape representative of an area around (e.g., in front of) the aircraft being scanned by a terrain awareness system of the aircraft. Such a shape may provide the pilot with an indication of what terrain is actually being scanned. As such, the displayed alert may indicate to the pilot that other terrain near the aircraft may also present a threat to the aircraft, but is not being scanned by the terrain awareness system (e.g., is currently outside of the alert scanning envelope). An aircraft 100 having a terrain awareness system is shown in FIG. 1 according to an exemplary embodiment. A representation of the alert envelope 105 of the terrain awareness system is also shown in FIG. 1.

It should be noted that the term aircraft, as utilized herein, may include any manned or unmanned object capable of flight. Examples of aircraft may include, but are not limited to, fixed-wing aerial vehicles (e.g., propeller-powered or jet-powered), rotary-wing aerial vehicles (e.g., helicopters), manned aircraft, unmanned aircraft (e.g., unmanned aerial vehicles, or UAVs), delivery drones, etc.

For the purposes of the present disclosure, the terms "location of interest" or "terrain" are used interchangeably and include any type of object or obstacle that could present a risk of collision to an aircraft. Examples of locations of interest include, but are not limited to, ground, hills, mountains, trees, rock formations, buildings, utility/transmission towers, other aircraft, etc. Locations of interest may be naturally occurring or man-made.

Figure 2:
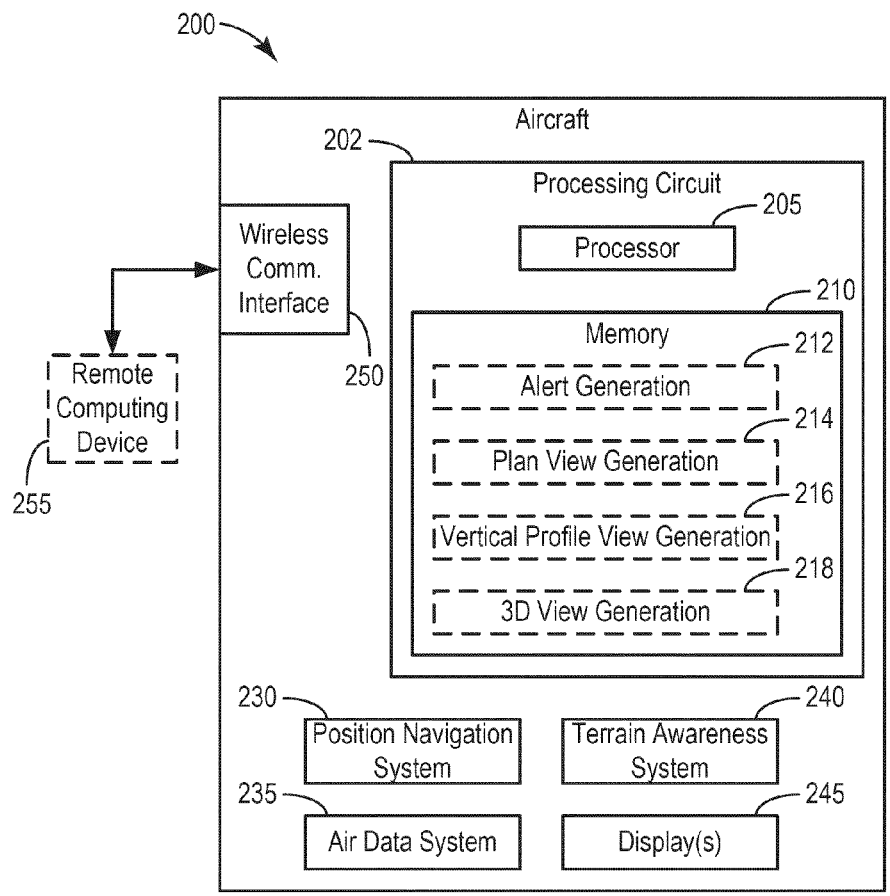
FIG. 2 is a block diagram of an aircraft configured to generate terrain alerts according to an exemplary embodiment.

Referring now to FIG. 2, a block diagram of an aircraft 200 having a processing circuit 202 for generating alert data formatted for display as alerts is shown according to an exemplary embodiment. Aircraft 200 may be any air-based platform, such as a fixed-wing or rotary-wing aircraft. Aircraft 200 includes a terrain awareness system 240 configured to collect (e.g., directly sense) data regarding one or more terrain features proximate to aircraft 200 that may pose a risk to aircraft 200. In some embodiments, terrain awareness system 240 may be or include a radar (e.g., millimeter-wave, or MMW, radar system) or LIDAR system. In some embodiments, terrain awareness system 240 may be or include a terrain awareness and warning system. In some embodiments, terrain awareness system 240 may be or include a weather radar system configured to detect features of terrain around aircraft 200. In some embodiments, aircraft 200 may include one or more position/navigation systems 230, such as an onboard Embedded Global Positioning System/Inertial Navigation System (EGI). In some embodiments, aircraft 200 may include an air data system 235 (e.g., an air data computer) that may collect data regarding wind, air speed, turbulence, and/or other air-related data. Aircraft 200 may include one or more wireless communication interfaces 250 configured to enable communication with other devices/platforms. In some embodiments, aircraft 200 may transmit data to a remote computing device 255 (e.g., a computing device at a control tower, etc.) using wireless communication interface(s) 250.

Processing circuit 202 includes at least one processor 205, which may be any type of general purpose or special purpose processor (e.g., FPGA, CPLD, ASIC, etc.). Processing circuit 202 also includes at least one memory 210, which may be any type of non-transitory computer or machine-readable storage medium (e.g., ROM, RAM, hard disk, flash memory, etc.). In some implementations, all or part of processing circuit 202 may be implemented using a graphics processing unit (GPU) in aircraft 200 configured to generate display data in a format that can be interpreted by one or more display devices 245 to generate display screens.

Memory 210 may include one or more modules including instructions that may be executed by processor 205 to perform various processing functions for aircraft 200. For example, memory 210 may include an alert generation module 212 configured to generate alert data for displaying alerts within one or more types of terrain display screens on one or more display devices 245 (e.g., CRT, LCD, LED, etc.). In some embodiments (e.g., some embodiments in which terrain awareness system 240 is a commercially available or off-the-shelf terrain awareness system), alert generation module 212 may receive warnings from terrain awareness system 240 and may generate alert data based on the warnings (e.g., generate alert data formatted for display as alerts provided at a position within the screens that is based on a position associated with the warnings). In some embodiments, alert generation module 212 may be integrated with or otherwise be a part of terrain awareness system 240, and alert generation module 212 may be configured to detect alerts by comparing elevation data for terrain near the aircraft with an alert threshold.

In some embodiments, memory 210 may include one or more modules configured to generate display data formatted for display on display device(s) 245 as one or more types of terrain display screens. For instance, a plan view generation module 214 may be configured to generate a plan view display screen representing the terrain near the aircraft. In some embodiments, a vertical profile view generation module 216 may generate a vertical profile view display screen representing terrain near (e.g., in front of) the aircraft within a particular vertical slice (e.g., a vertical slice selected by the pilot within the plan view display screen). In some embodiments, a three-dimensional (3D) view generation module 218 may generate a 3D view display screen representing terrain near the aircraft within three dimensions. In other embodiments, various other types of views may be generated for display on display device(s) 245. Plan view generation module 214, vertical profile view generation module 216, and/or 3D view generation module 218 may include one or more alerts, including alerts showing indicator lines, within the generated display data based on alert data generated by alert generation module 212.

In some embodiments, memory 210 may include one or more modules configured to generate data relating to the identified location of interest. For instance, in one embodiment, alert generation module 212 may be configured to calculate the distance value and a bearing value of the location of interest relative to the aircraft. The alert generation module 212 may be further configured to calculate an estimated time of impact in which the aircraft will make contact with the location of interest. In some embodiments, the estimated time of impact calculation may be based on the calculated distance value, calculated bearing value, the aircraft's velocity, altitude, rate of decent, and so on.

Figure 3:
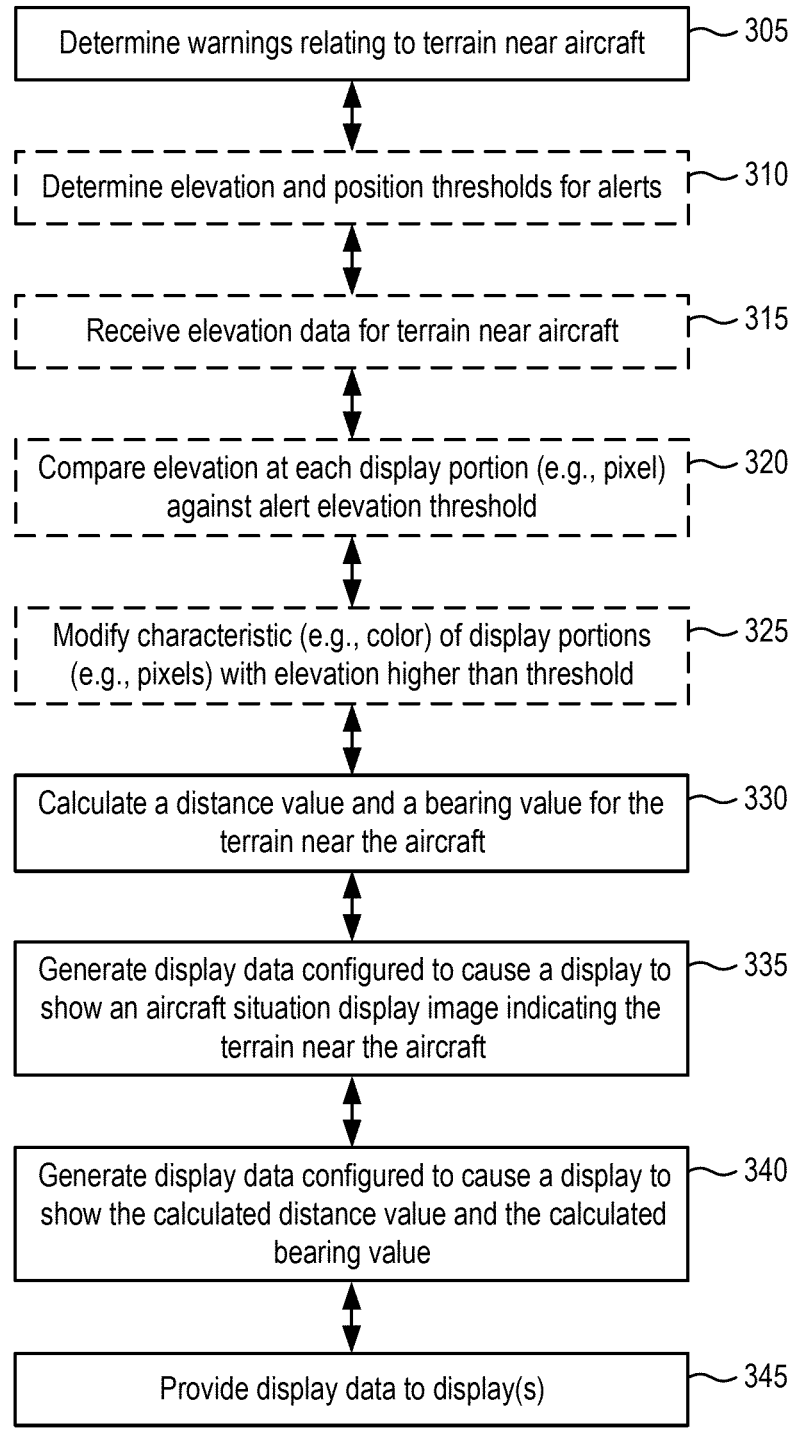
FIG. 3 is a flow diagram of a process for generating alert data formatted for display as terrain alerts on a display device according to an exemplary embodiment.

FIG. 3 illustrates a flow diagram of a process 300 for generating alert data formatted for display as terrain alerts on a display device according to an exemplary embodiment. Referring now to both FIGS. 2 and 3, processing circuit 202 may determine one or more warnings relating to terrain near aircraft 200 (305). Processing circuit 202 may receive the warnings from terrain awareness system 240. In some embodiments, terrain awareness system 240 may compare terrain elevation data for all terrain within a scan area (e.g., an FLTA, or Forward Looking Terrain Avoidance, envelope) to a threshold elevation, and may generate warnings for one or more terrain portions having an elevation higher than the threshold elevation. In some embodiments, a FLTA envelope may be utilized in accordance with TSO-C 151 (e.g., TSO-C 151c). In some embodiments, the threshold elevation may be an absolute elevation value. In some embodiments, the threshold elevation may be determined based on the current elevation of the aircraft or the projected elevation of an aircraft based on the aircraft's flight trajectory. For instance, in some embodiments, the threshold elevation may be a predetermined distance below the current altitude of the aircraft (e.g., 300 feet below the current altitude). In some embodiments, the threshold elevation may include elevations near (e.g., within a predetermined distance below) a set value, such as a set distance below a current elevation of the aircraft. For instance, if a warning elevation is set at 1000 feet below an aircraft, the threshold for providing warnings may be set to 200 feet below the warning elevation, which may help warn the pilot of terrain not only above the 1000 foot level but also near that level. In some embodiments, terrain awareness system 240 may generate warning data that identifies all portions of the terrain within the scan area that has an elevation above the threshold elevation.

In some embodiments, the warning data generated by terrain awareness system 240 may not indicate all terrain within the scan area having an elevation above the threshold elevation. For instance, terrain awareness system 240 may generate warnings indicating a single point of concern (e.g., a single position) with respect to the warning, such as a center of a terrain cell of concern. In some embodiments, the warning data generated by terrain awareness system 240 may indicate all terrain with the scan area having an elevation above the threshold elevation. For instance, terrain awareness system 240 may generate warnings indicating multiple points of concern with respect to warnings to prevent a pilot from steering into another warning area in attempts to avoid an initial warning area.

In some embodiments, processing circuit 202 may determine terrain to emphasize within an alert area based on warnings received from terrain awareness system 240. Processing circuit 202 may determine elevation and/or position thresholds for alerts (310). In some embodiments, the elevation and position thresholds may be stored within memory 210 and/or may be received from terrain awareness system 240. For instance, in some embodiments, the position threshold may include any positions within an area bounded by a boundary of the alert. In some such embodiments in which the alert is a predetermined shape, such as a circle, square, etc., the position threshold may include any positions within the area to be bounded by the alert within the display screen(s). For instance, for a circular alert, the position threshold may be a threshold radius around a position associated with the warning. In some embodiments, such as embodiments in which the alert area is representative of the scan area of terrain awareness system 240, the position threshold may include any positions within the scan area.

Processing circuit 202 may receive elevation data for terrain near aircraft 200 (315). The elevation data may be generated by terrain awareness system 240, and may be stored within a terrain database associated with terrain awareness system 240 and/or processing circuit 202. In some embodiments, the terrain database may be stored within memory 210 or in a memory associated with terrain awareness system 240. In some embodiments, the elevation data may also include pre-generated elevation data stored within the terrain database and/or within a separate topographic database. The elevation data may be represented using any sort of data structure (e.g., lookup table, linked list, etc.) capable of correlating positions elevations, such that an elevation at a particular position can be determined from the elevation data.

Processing circuit 202 may compare the elevation at each display portion (e.g., pixel, group of pixels, etc.) within the alert area against the alert elevation threshold (320). In some embodiments, elevation data may be available for each pixel to be displayed within a display screen, and processing circuit 202 may compare the elevation associated with each pixel to the threshold elevation to determine which pixels are associated with terrain having an elevation above the threshold. Processing circuit 202 may generate display data configured to modify a characteristic of the display portions with elevations higher than the threshold (325). For instance, processing circuit 202 may modify a color of the pixels having the elevations higher than the threshold elevation. In one such embodiment, processing circuit 202 may change the color of pixels having elevations higher than the threshold elevation to match a color of a border of the alert. For instance, if high risk terrain is represented in a mid-tone red within a topography map shown in a display image, and alerts are represented using a bright red border, processing circuit 202 may modify those portions of the high risk terrain appearing within the alert border to have a bright red color matching the alert border. Modifying the color in this fashion may help make it apparent to the pilot that this terrain is associated with the alert.

Processing circuit 202 may calculate a distance value and a bearing value for the terrain near the aircraft associated with the warnings upon which the alerts are based (330). Other alert data descriptive of the alert area may also be calculated, such as the amount of time before the aircraft reaches the warning area or location of interest (e.g., time before impact with terrain occurs). In some embodiments, processing circuit 202 may also calculate an elevation value for the terrain near the aircraft associated with the warnings. For example, the aircraft's current elevation may be compared with the elevation of the terrain associated with the warning, thereby providing flight crew with an indication of the altitude the aircraft much reach in order to safely avoid the terrain. The altitude value may be displayed with other alert data on a cockpit display screen (e.g., distance to terrain, flight time to terrain, etc.). The calculated alert data may overlap terrain shown on the display screen, thereby providing flight crew with an absolute visual indication of distance to the warning area, bearing of the warning area, and time until reaching the warning area. Likewise, the altitude value may overlap terrain shown on a display screen (e.g., a 2-D vertical situation display screen, etc.), thereby providing flight crew with an absolute visual indication of the altitude the aircraft must reach to safely pass over the terrain. Providing absolute visual indications of such information enables flight crew to immediately make appropriate corrective maneuvers.

Figure 6:
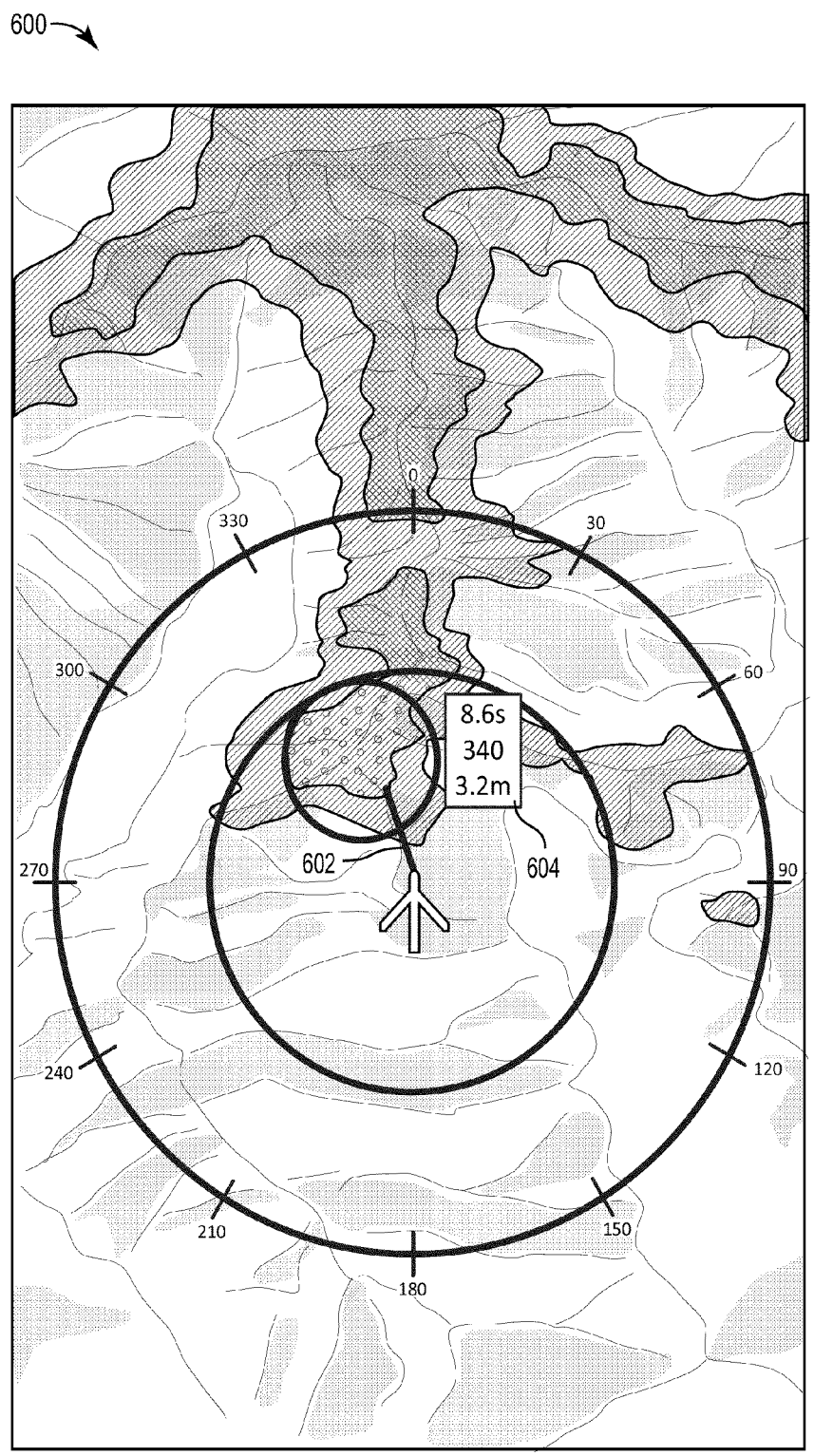
FIG. 6 is an illustration of a plan view display screen showing a third type of terrain alert according to an exemplary embodiment.
Figure 7:
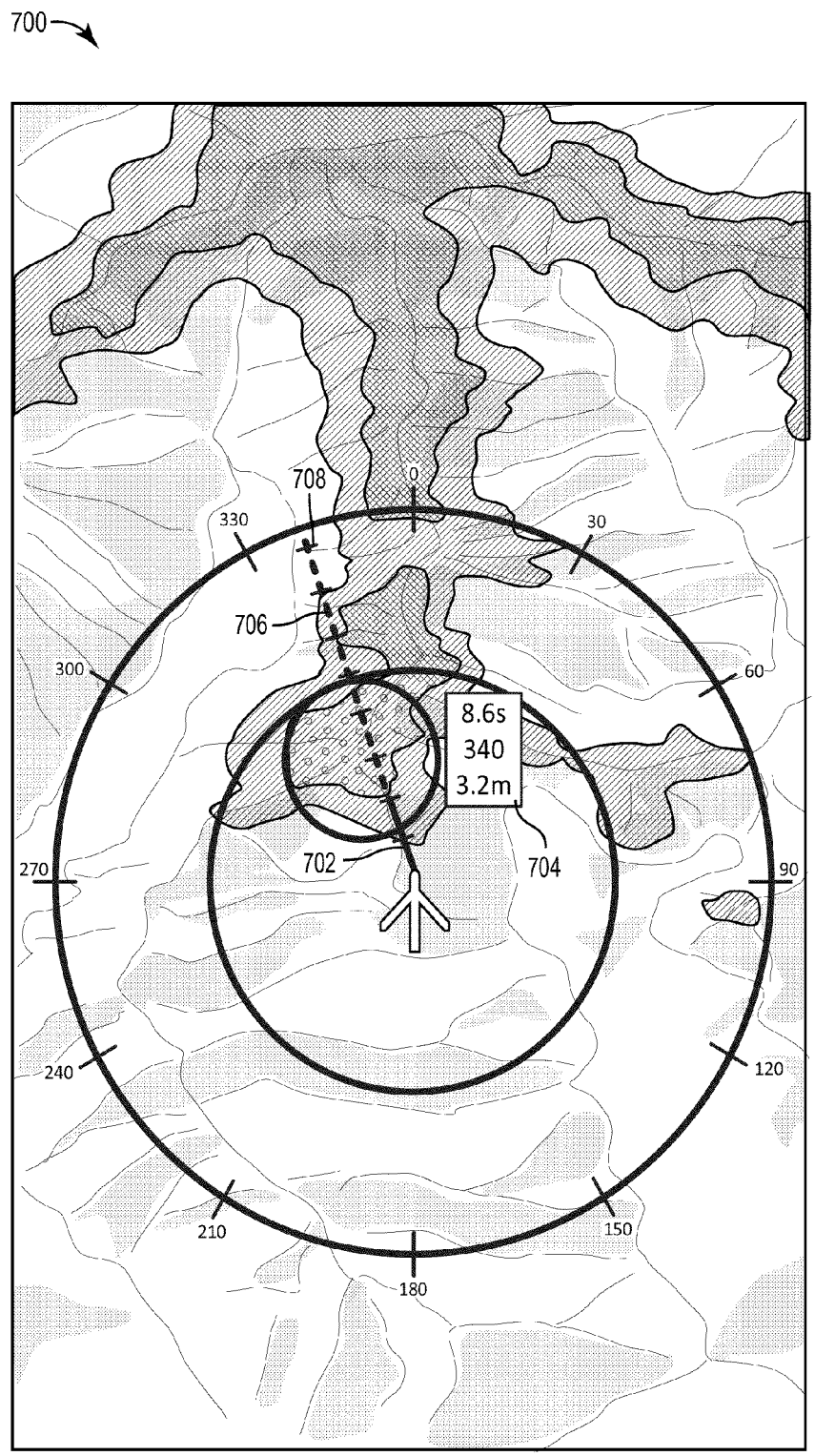
FIG. 7 is an illustration of a plan view display screen showing a fourth type of terrain alert according to an exemplary embodiment.

In some embodiments, the alerts include visual indications in the form of lines, text, graphics, or other indications of the bearing, distance, and time to the alert area. For instance, a line indicator, a countdown timer, and/or a distance indicator may be graphically displayed with an alert (340, 345). As shown in FIG. 6, an illustration of a plan view display screen showing a terrain alert is shown according to an exemplary embodiment. In some embodiments, the line indicator may be drawn from the aircraft to the location of interest, thereby visually indicating how far away and at what bearing the location of interest is in relation to the aircraft. In some embodiments, the line indicator may include markings that indicate the distance or bearing to the location of interest. For example, as shown in FIG. 7, the line indicator may include distance markings or hash marks 708 (e.g., similar to a ruler with regular scale markings) as well as extend through the location of interest to intersect with the map heading tape. In another embodiment, bearing, distance, and time indicators may be displayed along or near the line indicator.

In some embodiments, the processing circuit 202 may generate the indicator line 602 to be shown on flight display(s). Such an indicator line 602 may extend out toward the location of interest and provide indicia regarding the distances to the location of interest. Thus, a pilot is not only alerted to the presence of terrain, but is also able to quickly assess the distance to the terrain during flight. Distance indicia may include, but is not limited to, hash marks 708 along the indicator line, text or numbers, or symbols that indicate distances to the terrain. In one embodiment, a displayed indicator line 602 may be presented on screen such that it extends beyond the terrain to bisect bearing indicators on screen. For example, the indicator line 602 may appear as a dashed line through the terrain and as a sold line in the regions where it does not overlap with terrain.

In one embodiment, an indicator line 602 is provided to a display by the processing circuit. The indicator line 602 may be displayed such that it extends from the aircraft to a location of interest. In some embodiments, indicator line 602 includes various indicia to signify the distance between a point on or near indicator line 602 to the location of interest. Indicator line 602 may include any number of markings, such as hash marks 708, which signify different distances to the location of interest along the indicator line. For example, hash marks 708 may correspond to 10 nautical miles (NM), 5 NM, 3 NM, 2 NM, and 1 NM marks, respectively. The overall distance represented by indicator line 602 may be varied in other embodiments. Also, the intervals represented by hash marks 708 can be varied in other embodiments to represent different distance intervals than those shown in FIG. 7. Hash marks 708 can also include other graphical effect to distinguish the hash marks 708 from other symbolism used on the display. For example, hash marks 708 can include numerical distances contained within shapes (e.g., "shield symbols" or other shapes) that differ from other symbols used on the display.

The display of indicator line 602 and hash marks 708 can be based on the relative distance between the aircraft and the location of interest. In one embodiment, indicator line 602 is displayed when the aircraft is within a specified threshold distance to the location of interest. For example, the indicator line 602 may be displayed as part of a synthetic vision system when the aircraft is within 30 NM of the location of interest. In one embodiment, hash marks 708 may also fade away on the display as the aircraft approaches the location of interest.

The indicator line 602 generally allows a pilot to quickly identify both the presence of approaching terrain as well as determine the trajectory needed to avoid making impact with the terrain. Hash marks 708 also enable the pilot to quickly identify the distance to the location of interest along the indicator line. As a result, the pilot's situational awareness is significantly enhanced.

In some embodiments, the alerts include a countdown timer, absolute indication of bearing, and distance to the location of interest. In one embodiment, processing circuit 202 may continuously update the amount of time before the aircraft reaches the warning area or location of interest, and display the updated time on the display screen (345). In some embodiments, a description box 604 may pop-up or otherwise appear on the display screen when a warning is triggered. The description box 604 may include textual indicators, such as the relative bearing of the terrain in reference to the aircraft, the absolute bearing of the terrain, the distance in nautical miles to the terrain with respect to the aircraft, the countdown timer, among other indicators or warnings. In one embodiment, the description box, including the textual indicators, may flash at the same rate as the alerted terrain. In some embodiments, the indicator line 602 and description box 604 pop up or appear on screen when an alert is triggered and remain present so long as the alert condition exists. For instance, upon an aircraft dipping below a threshold elevation (e.g., 1000 feet), an alert may be triggered causing the line indicator and description box 604 to appear on a cockpit display and remain visible until the aircraft regains elevation beyond the threshold elevation.

In some embodiments, Processing circuit 202 may calculate a distance value and a bearing value for other locations of interest near the aircraft. For instance, an indicator line 602 may be generated based on terrain awareness system 240 or position navigation system 230 detecting a nearby airport or landing strip. In some embodiments, an alert symbol different from a terrain warning may indicate the presence of a nearby airport. The airport alert symbol may be colored, in some cases, based on the type of airport (e.g., the shape for an origin airport may be cyan, the shape for a destination airport may be magenta, the shape for an alternate airport may be white, etc.). The airport may be detected in any number of ways, such as by comparing the location of the aircraft to a stored terrain database, in response to receiving a communication from the airport or another land-based communication system, using image recognition on a video feed from an on-board camera, or the like. In some cases, the coloration of an airport alert symbol is varied on the display screen to signify different ranges between the aircraft and the airport. For example, the opacity and translucency of the airport alert symbol may be varied based on the distance to the aircraft.

In some embodiments, the alerts may be at least partially transparent, such that the underlying terrain is still visible through the alert. In some embodiments, the alert may include an alert boundary (e.g., border) surrounding an alert area associated with the alert, and the area bounded by the border may be hollow, or completely transparent. In some embodiments, the area bounded by the boundary may be partially transparent. For instance, the area may be shaded to call further attention to the presence of the alert, but may still be partially transparent so the underlying terrain remains visible. In some embodiments, stippling or other types of visual effects allowing for the underlying terrain to be seen through the alert may be utilized.

In some embodiments, the same shape may be used for all of the warnings, regardless of the size and/or shape of the terrain associated with the warnings. For instance, a same shape may be used for a warning associated with a large area of high risk terrain as for a small area of high risk terrain. In some such implementations, various aspects of the alert may change, such as size, dimensions of individual portions, angles between lines, etc. may vary, but the primary type of shape may stay the same. In some embodiments, the shape of the alert may be a circle, square, triangle, trapezoid, rectangle, or any other type of shape. In some embodiments, the shape may be centered around a position associated with the warning. In some embodiments, the shape may be centered around or proximate to a position of greatest immediate concern (e.g., a high elevation terrain portion closest to a current position of the aircraft). In some embodiments, all of the alerts may have a same size.

In some embodiments, the shape of the alert may be configured to represent a scan area of terrain awareness system 240. In some such embodiments, the area of the scan envelope and the displayed alert area/border may vary based on aircraft conditions, such as ground speed and/or rate of turning. For instance, the scan area may be larger/longer when the ground speed is higher (e.g., to provide a consistent look-ahead window/time) than when the ground speed is lower. The scan area may be expanded to a side to which an aircraft is turning and/or contracted on an opposite side when the aircraft turns, and such expanding/contracting may occur as a function of the rate of turning (e.g., if the turning is happening at a higher rate, the scan area may be expanded further than for a lower rate). Such a shape may provide the pilot with a sense of what terrain has been scanned, which may provide situational awareness with respect to terrain lateral to the aircraft. In some embodiments, the scan area may always be displayed to provide awareness of the scan area. In some such embodiments, the shape may be shown in a non-alerting color (e.g., nearly transparent) when not actively highlighting an alert so as to not distract or confuse the pilot. In some embodiments, the shape may be a test flight function that can be activated by a configuration parameter.

In some embodiments, processing circuit 202 may generate alert data causing display of alerts having multiple warning levels. For instance, processing circuit 202 may provide a first alert portion associated with a higher risk level, such as a warning alert portion (e.g., higher elevation and/or closer to the aircraft) and a second alert portion associated with a lower risk level, such as a caution alert portion (e.g., lower elevation and/or further away from the aircraft). In one such embodiment, the higher-risk area may be shown in one color (e.g., red), and the lower-risk area may be shown in another color (e.g., yellow). In some embodiments, at least a portion of the lower-risk area may be further away from the aircraft and/or have a lower elevation than at least a portion of the higher-risk area. In some embodiments, multiple indicator lines and multiple description boxes may appear near each indicator line. The indicator lines may have varying levels of transparency or colors that reflect the warning level of the alert area the indicator line 602 is drawn to. For instance, processing circuit 202 may provide a first indicator line 602 drawn and a first description box 604 associated with a higher risk level (e.g., higher elevation and/or closer to the aircraft) and a second indicator line 602 and second description box 604 associated with a lower risk level (e.g., lower elevation and/or further away from the aircraft). In this way, each terrain alert is prioritized based on the danger of the terrain to the aircraft.

In some embodiments, processing circuit 202 generates display data configured to cause a display to show an aircraft situation display image indicating the terrain near the aircraft (335), generate display data configured to cause a display to show the calculated distance value and the calculated bearing value (340), and provide the display data to a display (345). The display may be, for example, a head-up display (HUD) or a head-down (HDD) display. In general, a HUD is a form of electronic display situated within a pilot's normal field of view from the windshield of the aircraft. This differs from an HDD which requires the pilot to look down from the windshield to read the HDD. A synthetic or enhanced representation of the aircraft's surroundings may be provided to an HUD or HDD. For example, a synthetic vision system may use stored terrain data and/or received radar returns to create a 3-D representation of the terrain in front of the aircraft. According to various embodiments, an extended indicator line 602 for a location of interest may be depicted within the synthetic vision system. For example, an indicator line 602 may be depicted that extends from the aircraft out towards the location of interest up to ten nautical miles.

The TAWS may provide various aircraft situation display images in order to identify such terrain or structural hazards. The aircraft situation display image may be, for example a two-dimensional (2-D) horizontal situation display image including a top-down view of an aircraft's "own-ship" position as well as locations of interest in a particular area. The aircraft situation display image may also be a 2-D vertical situation display image including a side view of the location of interest of a particular area. To further facilitate the identification of potential hazards by a pilot and increase the situational awareness of the pilot, some aircraft are now equipped with synthetic vision systems. Synthetic vision systems generally operate by generating a three dimensional (3-D), virtual representation of the area in front of the aircraft. For example, a virtual representation of terrain, such as a mountain, may be displayed by a synthetic vision system to represent a physical mountain located in front of the aircraft. The virtual representation may also correct for natural effects that would otherwise obscure the view of the pilot such as weather and nighttime conditions.

In some embodiments, the pilot may select a direction within a plan view display screen (e.g., a vertical slice intersecting a terrain cell of concern to the pilot), and a vertical profile view display screen along the selected direction may be generated. In some embodiments, the direction may be selected (e.g., automatically) based on a current aircraft track or heading. In some embodiments, alert data may be generated to display alerts for the warnings within the vertical profile view display screen. In some such embodiments, a position and/or length of the alerts shown within the vertical profile view display screen may be based on the position and/or length of the alerts as shown in the plan view display screen. This may help the displayed alerts between the screens to appear consistent to the pilot and avoid confusion.

Figure 4:
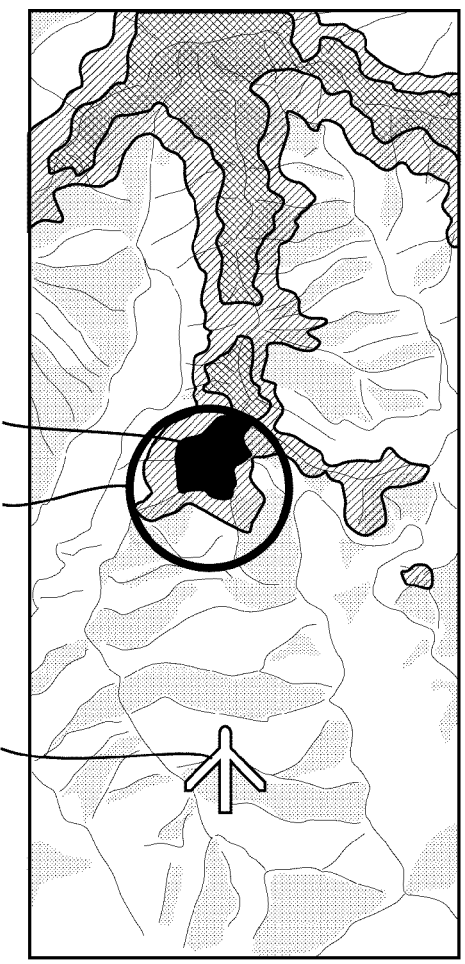
FIG. 4 is an illustration of a plan view display screen showing a first type of terrain alert according to an exemplary embodiment.

FIGS. 4 through 7 provide illustrative display screens that may be generated based on alert/display data generated by processing circuit 202, according to exemplary embodiments. Referring now specifically to FIG. 4, a plan view display screen 400 is shown that includes an aircraft icon 405 representing a current position of the aircraft and an alert 410 highlighting terrain of potential risk to the aircraft. In the illustrated embodiment, alert 410 has a circular shape. In some such embodiments, a size and/or shape of the alerts may be the same for all generated warnings. Plan view display screen 400 also illustrates a high risk terrain portion 415 associated with terrain above a threshold elevation that is within a boundary of alert 410. In various embodiments, an appearance of high risk terrain portion 415 may be modified in one or more of a variety of ways, such as by modifying a color, size, shading, etc. of the terrain, causing the terrain to blink/flash, etc. In one such embodiment, a color of high risk terrain portion 415 may be modified to differentiate from the other high-elevation terrain displayed within the topographic map shown in FIG. 4 (e.g., to match a color of alert 410).

Figure 5:
FIG. 5 is an illustration of a plan view display screen showing a second type of terrain alert according to an exemplary embodiment.

FIG. 5 illustrates another plan view display screen 500 including an alert 510 having a shape based upon a scan area of the terrain awareness system according to an exemplary embodiment. In the illustrated embodiment, the same terrain is shown as was shown in FIG. 4. However, the alert 510 covers a different area than alert 410, and a different high risk terrain portion 515 appears within the alert area and is visually modified.

FIGS. 6 and 7 illustrate additional display screens that may be generated based on alert/display data generated by processing circuit 202, according to exemplary embodiments. FIGS. 6 and 7 illustrate a high risk alert, including indicator line 602 and description box 604. In this instance, display 600 includes description box 604 and indicator line 602. The description box 604 and indicator line 602 pops up when an alert condition is triggered. The description box 604 includes information relating to the location of interest (i.e., terrain), including the time before impact with the terrain (e.g., 8.6 seconds), the absolute bearing of the terrain (e.g., 340 degrees), and the distance of the aircraft from the closest point of the location of interest (e.g., 3.2 miles).

Referring specifically to FIG. 7, display 700 includes the same elements of display 600 but with the inclusion of an extended indicator line 706 and hash marks 708. The extended indicator line 706 extends beyond the location of interest to intersect with bearing rings shown on the display. In this instance, indicator line 702 is shown as a solid line and extends from the aircraft to the initial point of the location of interest. Extended indicator line 706 extends from the initial point of the location of interest (i.e., at the termination of indicator line 702) to the bearing rings. As such, the pilot of the aircraft may simply glance at the bearing rings in order to quickly determine the bearing of the location of interest.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device in the form of a computer, including a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method, comprising:
   determining a location of interest relative to an aircraft using a terrain awareness and warning system;
   calculating a distance value and a bearing value for the location of interest relative to the aircraft;
   providing first display data to an electronic display, the first display data configured to cause the electronic display to show an aircraft situation display image indicating the location of interest relative to the aircraft; and
   providing second display data to the electronic display, the second display data configured to cause the electronic display to show the calculated distance value and the calculated bearing value.

2. The method of claim 1, wherein the second display data is further configured to cause the electronic display to show an indicator line extending from the aircraft to the location of interest.

3. The method of claim 2, wherein the indicator line includes markings, wherein the markings indicate distances to the location of interest.

4. The method of claim 1, further comprising:
   calculating an amount of time that the aircraft will reach the location of interest, wherein the second display data is further configured to cause the electronic display to show the calculated amount of time.

5. The method of claim 4, wherein the calculated amount of time is based on the velocity of the aircraft.

6. The method of claim 4, further comprising:
   updating the second display data as the aircraft approaches the location of interest.

7. The method of claim 1, further comprising:
   calculating an elevation value of the location of interest relative to the aircraft, wherein the second display data is further configured to cause the electronic display to show the elevation value.

8. The method of claim 1, further comprising:
   comparing an altitude of the aircraft with an altitude threshold, wherein the second display data is provided to the electronic display based in part on whether the altitude of the aircraft is above the altitude threshold.

9. The method of claim 8, further comprising:
   comparing a horizontal distance between the aircraft and the location of interest to a horizontal distance threshold, wherein the second display data is provided to the electronic display based in part on whether the horizontal distance between the aircraft and the location of interest is below the horizontal distance threshold.

10. A system, comprising:
an electronic display; and
an electronic processor configured to:
  determine a location of interest relative to an aircraft using a terrain awareness and warning system;
  calculate a distance value and a bearing value for the location of interest relative to the aircraft;
  provide first display data to an electronic display, the first display data configured to cause the electronic display to show an aircraft situation display image indicating the location of interest relative to the aircraft; and
  provide second display data to the electronic display, the second display data configured to cause the electronic display to show the calculated distance value and the calculated bearing value.

11. The system of claim 10, the electronic processor further configured to:
  calculate an amount of time that the aircraft will reach the location of interest, wherein the second display data is further configured to cause the electronic display to show the calculated amount of time.

12. The system of claim 11, wherein the calculated amount of time is based on the velocity of the aircraft.

13. The system of claim 11, the electronic processor further configured to:
  update the second display data as the aircraft approaches the location of interest.

14. The method of claim 10, further comprising:
  calculating an elevation value of the location of interest relative to the aircraft, wherein the second display data is further configured to cause the electronic display to show the elevation value.

15. The system of claim 10, wherein the second display data is further configured to cause the electronic display to show an indicator line extending from the aircraft to the location of interest, and wherein the indicator line includes markings, wherein the markings indicate distances to the location of interest.

16. The system of claim 10, the electronic processor further configured to:
  compare an altitude of the aircraft with an altitude threshold, wherein the second display data is provided to the electronic display based in part on whether the altitude of the aircraft is above the altitude threshold.

17. The system of claim 16, the electronic processor further configured to:
  compare a horizontal distance between the aircraft and the location of interest to a horizontal distance threshold, wherein the second display data is provided to the electronic display based in part on whether the horizontal distance between the aircraft and the location of interest is below the horizontal distance threshold.

18. One or more non-transitory computer-readable storage media having instructions stored thereon, the instructions being executable by one or more processors of an aircraft to:
  determine a location of interest relative to an aircraft using a terrain awareness and warning system;
  calculate a distance value and a bearing value for the location of interest relative to the aircraft;
  provide first display data to an electronic display, the first display data configured to cause the electronic display to show an aircraft situation display image indicating the location of interest relative to the aircraft; and
  provide second display data to the electronic display, the second display data configured to cause the electronic display to show the calculated distance value, the calculated bearing value, and an indicator line extending from the aircraft to the location of interest.

19. The one or more non-transitory computer-readable storage media of claim 18, the instructions being further executable by one or more processors of the aircraft to:
  calculate an amount of time that the aircraft will reach the location of interest, wherein the second display data is further configured to cause the electronic display to show the calculated amount of time.

20. The one or more non-transitory computer-readable storage media of claim 18, the instructions being further executable by one or more processors of the aircraft to:
  update the second display data as the aircraft approaches the location of interest.

21. The one or more non-transitory computer-readable storage media of claim 18, wherein the indicator line includes markings, wherein the markings indicate distances to the location of interest.

22. The one or more non-transitory computer-readable storage media of claim 18, the instructions being further executable by one or more processors of the aircraft to:
  compare an altitude of the aircraft with an altitude threshold, wherein the second display data is provided to the electronic display based in part on whether the altitude of the aircraft is above the altitude threshold.

23. The one or more non-transitory computer-readable storage media of claim 22, the instructions being further executable by one or more processors of the aircraft to:
  compare a horizontal distance between the aircraft and the location of interest to a horizontal distance threshold, wherein the second display data is provided to the electronic display based in part on whether the horizontal distance between the aircraft and the location of interest is below the horizontal distance threshold.

* * * * *